Nov. 2, 1937.  A. W. ASHLEY  2,097,713
BOLTED JOINT
Filed Dec. 14, 1935

Inventor
Arthur W. Ashley
By Jack A. Ashley
Attorney

Patented Nov. 2, 1937

2,097,713

UNITED STATES PATENT OFFICE 2,097,713

BOLTED JOINT

Arthur W. Ashley, Houston, Tex.

Application December 14, 1935, Serial No. 54,365

3 Claims. (Cl. 220—81)

This invention relates to new and useful improvements in bolted joints.

An object of the invention is to provide an improved bolted joint of the fluid-tight type.

In some respects this invention is an improvement upon the joint shown in my co-pending application filed July 1, 1935, Serial No. 29,207, wherein a yielding or elastic ring is crowded around the threads of the bolt to form a fluid seal.

In turning the nut to draw the sheets and parts together, pressure is also applied to the yieldable ring. The improvement lies in shielding or withholding pressure from said ring until the sheets and other elements have been brought into intimate contact, and then distorting the ring upon the final turns of the nut. This makes for a better joint and prevents any tendency to prematurely distort the yieldable ring before the joint is fully tight.

A particular object of the invention is to provide an improved joint wherein the metallic washer or other contacting member is dished or offset to house or receive the yieldable ring, whereby said washer or member will first engage the sheet or other part which is to be fastened to another sheet or part, and take up the slack by bringing said parts into intimate contact before pressure is applied to said ring.

A further object of the invention is to provide a metallic washer or member as set forth which will flatten out upon the final turns of the nut, thus distorting the yieldable or elastic ring into the bolt hole and around the bolt threads, as the fastening of the joint is being completed.

A construction designed to carry out the invention will be hereinafter described, together with other features of the invention.

Figure 1:
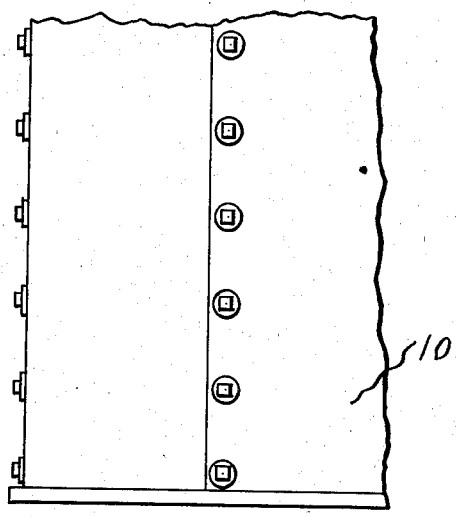
Figure 2:
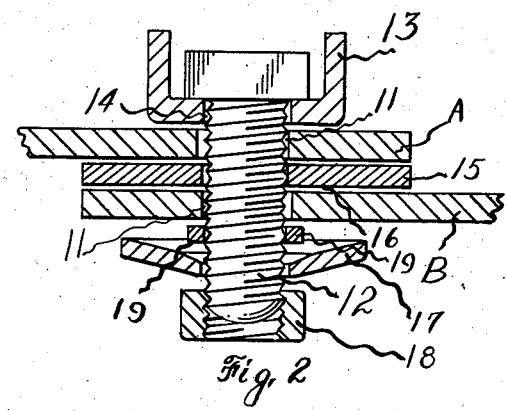
Figure 3:
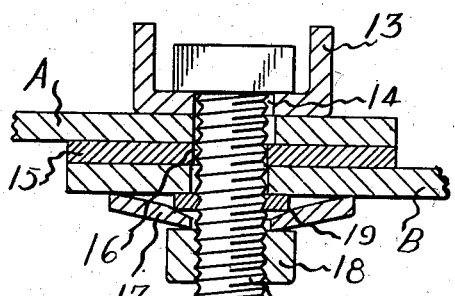
Figure 4:
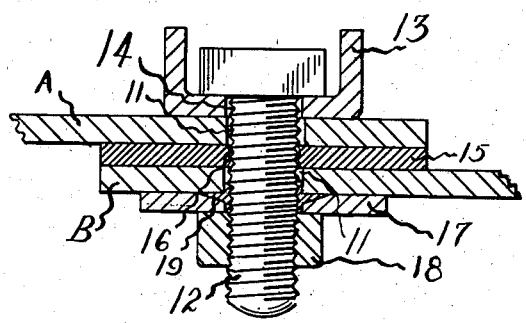
Figure 5:
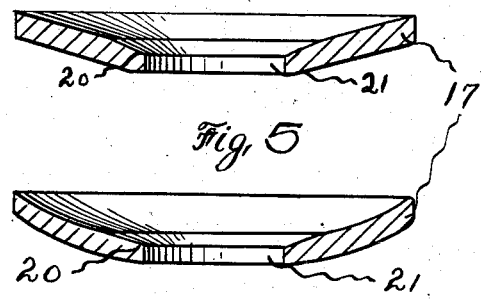
Figure 6:
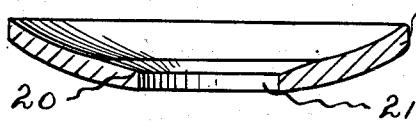

The invention will be more readily understood from a reading of the following specification and by reference to the accompanying drawing, in which an example of the invention is shown, and wherein:

Figure 1 is an elevation of a portion of a metal tank having its sheets fastened by joints constructed in accordance with the invention, Figure 2 is an enlarged transverse sectional view showing one of the bolted joints before the parts are drawn together, Figure 3 is a similar view showing the parts drawn together prior to final tightening, Figure 4 is a like view showing the washer flattened, the elastic ring distorted and the joint completed, and Figures 5 and 6 are enlarged cross-sections of two forms of washers.

In the drawing, the numeral 10 designates a portion of a metal tank which is constructed of a plurality of metal sheets or plates A and B. Each plate has a plurality of enlarged bolt holes 11 spaced apart along its vertical edge, so that when the plates are overlapped, in joining them together, said holes will register. It is customary to enlarge the bolt holes 11 so that the bolts 12 may be more readily passed therethrough, thus making an exact registration of the hole of one plate with holes of the other plate unnecessary.

A channel bar 13 may be placed along one side of the joint and provided with holes 14 for receiving the bolts, whereby their heads are held against rotation. However the invention does not depend upon such a bar and it may be omitted or any other suitable bar may be used.

In fastening the plates A and B together, an elongate strip of packing material 15 is inserted between the overlapping portions of said plates. The strip is provided with bolt holes 16 which are usually made smaller than the holes 11 so that the bolts 14 will more snugly fit in the strip, thereby guarding against leaks.

Where the bar 13 is placed against the plate A, a washer 17 is passed over the protruding end of each bolt and a nut 18 is screwed on the bolt to engage said washer. The washer is an important feature of the invention. Before placing the washer and nut on the bolt, a yieldable or elastic ring or annulus 19 is slipped onto the bolt and pushed firmly against the plate B. This should snugly fit the bolt.

The washer 17 is offset, dished or crowned so that its marginal edge will engage the plate B and the ring will be housed in said washer as is shown in Figure 3. In Figure 5 an enlarged cross-section of the washer is shown in which the washer is offset and provided with an inclined seat or recess 20 surrounding its bolt hole 21. This hole is not as large as the holes 11, but is just large enough to allow the washer to be freely slipped on the bolt. In Figure 6 a dished washer is shown.

By offsetting or dishing the washer, it is obvious that when the nut 18 is turned to tighten the joints, the elastic ring 19 will not be distorted. The edge or rim of the washer bearing on the plate B will force said plate toward the plate A, thereby taking up the slack and clamping the packing strip 15 between the plates, upon the initial turns of the nut 18. Continued rotating of the nut will flatten the washer from the position shown in Figure 3 to the position shown in Figure 4.

By first taking up the slack and firmly clamping the plates A and B together, the ring is shouldered or protected from the pressure until such time as the other elements have been brought into intimate contact, thereby eliminating any tendency to prematurely distort the elastic ring during the movement of the plates and other elements toward each other. After said plates have been brought into intimate contact, the final turns of the nut flatten the washer which applies pressure to the elastic ring to crowd the same into the opening surrounding the bolt to provide a leak-proof joint. The provision of the offset or dished washer prevents any pressure being applied to the elastic ring until after all of the other elements have moved into intimate contact with each other. During such movement, said ring is fully protected from any pressure, and thus all danger of damaging the washer is eliminated. The ring is distorted into its packing or sealing position only when the other elements have moved into contact with each other, and pressure is applied to said ring at the time when the joint is practically complete.

Because of the "bite" or the frictional engagement of the rim of the washer 17 with the plate B or other member, said washer does not rotate with the nut, but is held against rotation. It is obvious that the head of the bolt and the nut could be reversed with relation to each other, in which case the head of said bolt instead of the nut would engage the washer. The ring 19 may be constructed of leather, rubber, or any other suitable yieldable or elastic material.

It would also be possible to distort the ring 19 without crowding it into its bolt hole, particularly where the hole was reduced to the size of the bolt. Also the washer 17 may not always be completely flattened, but the ring would be distorted sufficiently to pack the joint.

What I claim and desire to secure by Letters Patent is:

1. A bolted joint for a plurality of metallic plates having their edge portions overlapping and provided with registering openings in said overlapping portions, including, non-rotatably mounted threaded bolts adapted to be passed through said openings, a nut on the threaded portion of each bolt beyond one of said plates, a yieldable packing ring surrounding each bolt and opposed to the outer side of said plate, and dished deformable means surrounding each bolt between said plate and the nut, said dished deformable means covering said packing ring and extending peripherally therebeyond whereby to engage said plate and shield said packing ring from pressure until the nut is tightened and the overlapping plate portions are drawn together, after which time said dished deformable means is flattened by further tightening of the nut and said packing ring is pressed and crowded into the opening about the bolt to seal said opening.

2. A bolted joint for a plurality of metallic plates having their edge portions overlapping and provided with registering openings in said overlapping portions, including, threaded bolts extending through said openings, means for preventing rotation of said bolts as applied, a nut on the outer end portion of each bolt, a dished deformable washer surrounding each bolt between the nut thereon and one of said plates, and a yieldable packing ring surrounding each bolt between said plate and said dished deformable washer, said washer covering and extending peripherally beyond said packing ring whereby to engage said plate and shield said packing ring from pressure until the plates have been drawn together to form the joint upon the initial tightening of the nut on the bolt, after which time the nut is further tightened to flatten said washer whereby to apply pressure to said packing ring and crowd it into the opening about the bolt to seal said opening.

3. A bolted joint for a plurality of metallic plates having their edge portions overlapping and provided with registering openings in said overlapping portions, including, bolts extending through said openings, a yieldable packing ring carried by each bolt in opposed relation to the outer side of one of said plates, an arched deformable element disposed on each bolt over said packing ring to move endwise of the bolt and bearing normally against said plate and shielding said packing ring from pressure, and a nut on each bolt adapted to be first tightened against said arched deformable element to draw the plates together to form the joint without affecting said packing ring, after which time the continued tightening of the nut flattens said arched deformable element whereby to press and distort said packing ring and crowd it about the bolt with sealing effect in the opening.

ARTHUR W. ASHLEY.